US012561174B2

(12) United States Patent
Bhat et al.

(10) Patent No.: US 12,561,174 B2
(45) Date of Patent: Feb. 24, 2026

(54) FRAMEWORK FOR EFFECTIVE STRESS TESTING AND APPLICATION PARAMETER PREDICTION

(71) Applicant: Oracle International Corporation, Redwood Shores, CA (US)

(72) Inventors: Nagaraj N. Bhat, Bangalore (IN); Joydeb Mondal, Bangalore (IN); Amritanshu Jain, Bangalore (IN); Pramir Sarkar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 628 days.

(21) Appl. No.: 17/954,787

(22) Filed: Sep. 28, 2022

(65) Prior Publication Data
US 2024/0103925 A1 Mar. 28, 2024

(51) Int. Cl.
*G06F 9/44* (2018.01)
*G06F 9/48* (2006.01)
*G06F 9/50* (2006.01)

(52) U.S. Cl.
CPC ............ *G06F 9/505* (2013.01); *G06F 9/4887* (2013.01)

(58) Field of Classification Search
CPC ...................................................... G06F 9/545
USPC ........................................................ 718/104
See application file for complete search history.

(56) References Cited

U.S. PATENT DOCUMENTS

| | | | |
|---|---|---|---|
| 2018/0349170 A1* | 12/2018 | Feng ..................... | G06F 9/5016 |
| 2020/0285503 A1* | 9/2020 | Dou ...................... | G06F 9/5072 |
| 2022/0121502 A1* | 4/2022 | Schmitt ................. | G06F 9/4881 |

* cited by examiner

*Primary Examiner* — Timothy A Mudrick
(74) *Attorney, Agent, or Firm* — Kilpatrick Townsend & Stockton LLP

(57) ABSTRACT

Techniques disclosed herein can include receiving an instruction to perform a stress test on one or more cloud computing resources of a cloud computing system. Worker nodes of the cloud computing system can be provisioned by a resource manager to perform the stress test on the cloud computing resources. The resource manager can instruct the one or more worker nodes of the cloud computing system to perform the stress test. Data generated by the worker nodes during the stress test can be received by the resource manager and used to train a projection framework comprising a trained machine learning model. The projection framework can generate a resource projection and the projection can be used to provision cloud computing resources to host the cloud service.

20 Claims, 10 Drawing Sheets

● Support vector machines

● Neural nets

FRAMEWORK FOR EFFECTIVE STRESS TESTING AND APPLICATION PARAMETER PREDICTION

BACKGROUND

Stress testing a cloud service can be time consuming and labor intensive. Performing each stress test can require provisioning cloud service resources and pushing those resources beyond normal operating conditions. The resources can fail during the test and stress testing can pose risks to other services hosted by the cloud service provider. Accordingly, improvements to stress testing for a cloud service are desirable.

BRIEF SUMMARY

A system of one or more computers can be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes a computer-implemented method. The method also includes receiving, at a computing device, an instruction to perform a stress test on one or more cloud computing resources of a cloud computing system. The method includes provisioning, one or more worker nodes of a pool of worker nodes of the cloud computing system to perform the stress test on the one or more cloud computing resources. The one or more worker nodes can be provisioned by a resource manager of the computing device. The method includes instructing the one or more worker nodes of the cloud computing system to perform the stress test on the one or more cloud computing resources. The method includes receiving data generated by the one or more worker nodes during the stress test. The method includes providing the data generated by the one or more worker nodes as input to a projection framework that may include a trained machine learning model. The method also includes receiving a resource projection from the projection framework. The method also includes provisioning one or more cloud computing resources of the cloud computing system based on the resource projection. Other embodiments of this aspect include corresponding computer systems, apparatus, and computer programs recorded on one or more computer storage devices, each configured to perform the actions of the methods.

Implementations may include one or more of the following features. Methods where the resource manager distributes loads to the one or more worker nodes in a round robin fashion. Methods where the instruction to perform the stress test is scheduled, time based, or trigger based. Methods where the instruction to perform the stress test may include a past resource projection from a previous stress test. Methods where the resource manager is a slurm workload manager. Methods where the one or more worker nodes perform the stress test simultaneously. Methods where provisioning one or more cloud computing resources may include increasing a region capacity of the cloud computing system. Implementations of the described techniques may include hardware, a method or process, or computer software on a computer-accessible medium.

One general aspect includes a system. The system includes memory configured to store instructions and one or more processors configured to execute the instructions. The instructions cause the system to receive an instruction to perform a stress test on one or more cloud computing resources of a cloud computing system. The instructions cause the system to provision one or more worker nodes of a pool of worker nodes of the cloud computing system to perform the stress test on the one or more cloud computing resources. The worker nodes can be provisioned by a resource manager of a computing device. The instructions cause the system to instruct the one or more worker nodes of the cloud computing system to perform the stress test on the one or more cloud computing resources. The instructions cause the system to receive data generated by the one or more worker nodes during the stress test. The instructions cause the system to provide the data generated by the one or more worker nodes as input to a projection framework may include a trained machine learning model. The instructions cause the system to receive a resource projection from the projection framework. The instructions cause the system to provision one or more cloud computing resources of the cloud computing system based on the resource projection. Other embodiments of this aspect include corresponding computer systems, apparatus, and computer programs recorded on one or more computer storage devices, each configured to perform the actions of the methods.

One general aspect includes a non-transitory computer-readable medium storing a set of instructions. The instructions include receiving an instruction to perform a stress test on one or more cloud computing resources of a cloud computing system. The instructions include provisioning one or more worker nodes of a pool of worker nodes of the cloud computing system to perform the stress test on the one or more cloud computing resources. The worker nodes are provisioned by a resource manager of a computing device. The instructions include instructing the one or more worker nodes of the cloud computing system to perform the stress test on the one or more cloud computing resources. The instructions include receiving data generated by the one or more worker nodes during the stress test. The instructions include providing the data generated by the one or more worker nodes as input to a projection framework may include a trained machine learning model. The instructions include receiving a resource projection from the projection framework. The instructions include provisioning one or more cloud computing resources of the cloud computing system based on the resource projection. Other embodiments of this aspect include corresponding computer systems, apparatus, and computer programs recorded on one or more computer storage devices, each configured to perform the actions of the methods.

DETAILED DESCRIPTION

Figure 1:
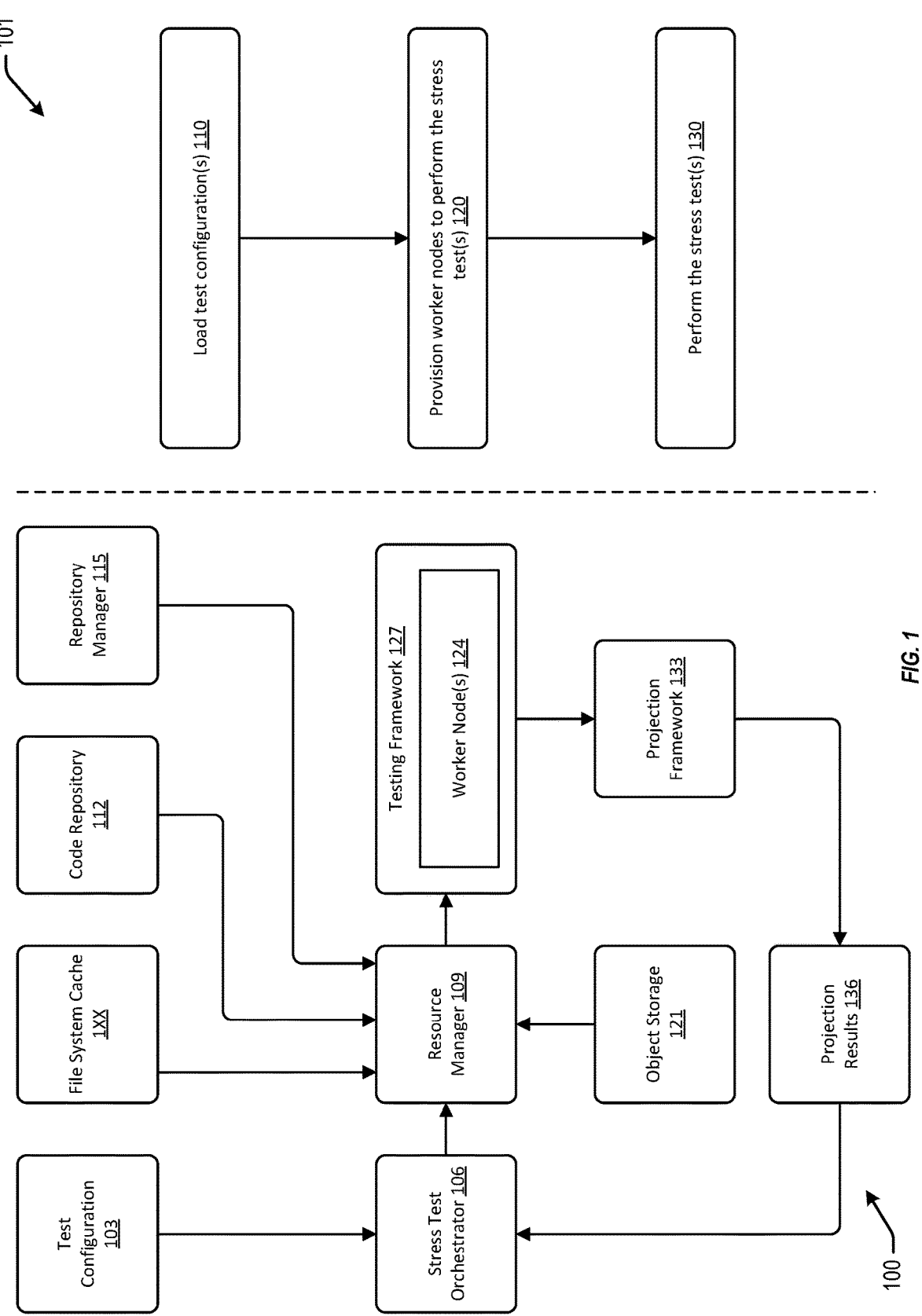
FIG. 1 shows a simplified diagram of a stress testing framework and method of using the testing framework according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for stress testing a cloud service. Selecting resources for a cloud service can mean balancing the service's performance against resource costs. Resources, including data storage, servers, databases, networking, etc., can be expensive or scarce. Accordingly, a cloud service is provisioned with enough resources to provide the service, but not so many resources that capacity is wasted. Balancing cost vs performance can involve testing to collect data on the cloud service's performance.

Stress testing can be a type of performance testing that involves observing a cloud service's performance under varying loads. The service can be pushed beyond normal operating conditions to observe how and why a service fails. For example, the service can fail because of a substantial increase in latency caused by insufficient processing power. The circumstances that cause a service to fail can be used to determine which resources to allocate to the service. Accordingly, a cloud service, such as a machine learning model, may be allocated sufficient resources to provide the service with an acceptable risk of failure.

Stress testing may be performed on new cloud services that have not been deployed to the cloud network or existing services that are already in production. For instance, a cloud service may be stress tested before the service is expanded or migrated to a new region within the cloud service provider's network. Stress testing may involve deploying the cloud service to different hardware configurations and observing the service's performance. Such testing can be time consuming because the service needs to be deployed to the cloud service provider's physical resources. Stress testing can include tens or hundreds of different hardware configurations and deploying and testing these configurations can take a substantial amount of time. In addition, stress testing can involve pushing a service to failure and causing a failure on the cloud service provider's network (e.g., cloud network) can be risky. A failed service may degrade other cloud services or even cause the other services to fail.

The risks involved in stress testing can be mitigated by using a projection framework to extrapolate from stress testing results. The projection framework can be a machine learning model that has been trained to determine a resource configuration for a given model. Model characteristics can be input to the projection framework and the framework can output a resource configuration based on the input. Instead of stress testing a cloud service on tens or hundreds of hardware configurations, the projection framework can use a few stress testing results to project the cloud service's performance on a large number of configurations. The stress testing results can be used to train, or post train, the projection framework's machine learning model and the model can be used to project resource configurations. In some implementations, the projection framework may identify the most promising resource configurations that can be deployed and tested on the cloud network.

In an illustrative example, a cloud service provider's customer wishes to deploy a new service, in this case a chatbot, to the cloud network. The customer provides a test configuration, including characteristics about the service, a few resource configurations that the customer would like evaluated, and a desired performance for the service, to a stress test orchestrator. The stress test orchestrator uses a resource manager to provision nodes corresponding to the test configuration and to perform the stress tests. The resource manager provides the stress test results to a projection framework containing a machine learning model. The stress test results, and information from the test configuration, are used to train the projection framework's machine learning model. The model identifies a resource configuration that satisfies the customer's desired performance, and the resource manager deploys the service to the identified resource configuration.

FIG. 1 shows a simplified diagram 100 of a stress testing framework and method 101 of using the testing framework according to various embodiments. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 101 in greater detail, at block 110 test configuration(s) can be provided. The test configuration(s) 103 can be provided to stress test orchestrator 106 via a user interface (UI) or the test configuration can be provided as a script (e.g., via a command-line interface (CLI)). The stress test orchestrator 106 can be a load testing tool or performance testing framework such as Gatling. The test configuration can include the test parameters for the service being tested such as the service type, the service level agreement (SLA) requirements, a character limit for the service (e.g., the character limits for a chatbot), the expected latency for the service, the maximum batch size, whether a graphics processing unit (GPU) is required, the node types, the model or framework type, and one or more custom features. The test configuration can include a resource manager configuration for the resource manager 109 including the locations of models, codes, docker files, etc. The test configuration may also include a desired stress test performance for the cloud service (e.g., the desired the transactions per second, queries per second, a failed transactions limit, the kilobits (KBs) per second for the service, the total number of transactions that can handled by the system, and the total number of queries that the system can handle).

At block 120, worker nodes can be provisioned to perform the stress test. The worker nodes can be provisioned with one or more cloud computing resources by a resource manager 109 in response to the test configuration received from the stress test orchestrator 106. The resource manager can be a commercially available workload manager such as the Slurm Workload Manager. The cloud computing resources can include one or more central processing units (CPUs), storage devices (e.g., hard disk drive (HDD), solid state drive (SSD)), storage partitions (e.g., volumes), virtual machines, bare metal machines, networking resources (e.g., smart network interface cards (smartNICs)), and the like.

The resource manager 109 can retrieve build parameters from locations specified in the test configuration received from the stress test orchestrator 106. The build parameters can be used to create a test build and the test configuration can identify a version of the cloud service's code that can be retrieved from the code repository. A test build can be a wrapped version of the cloud service that can be used to perform a stress test. The code repository 112 may contain multiple versions of the service's code and the test build can be created from a particular version of code that is pulled from the repository.

The build parameters can identify a docker file that can be used to wrap the cloud service's code to create the test build. The resource manager 109 can wrap the service's code in a docker file that is retrieved from the repository manager 115. The docker file may have to be built after the file is retrieved from the repository manager 115. A built docker can be stored in the file system cache 118 and the file can be retrieved and used to wrap code retrieved from the code repository 112. Models used in the cloud service can be retrieved from object storage 121 and a model may be added to the test build. Resource manager 109 can provision one or more worker node(s) 124 in the testing framework 127 using the test parameters. The test build(s) can be pushed to the worker node(s) 124 in the testing framework 127 by the resource manager 109.

At block 130, the stress test(s) can be performed. The test build(s) can be stress tested on the provisioned worker node(s) 124 in testing framework 127. A test build can be tested on one or more worker nodes 124, and multiple test builds can be stress tested simultaneously on different nodes. The results of the stress test(s) (e.g., stress test results) can be sent from the projection framework 133 to the stress test orchestrator 106. The stress test results can include information about the transactions per second, queries per second, the number of failed transactions, the kilobits (KBs) per second that the test build can handle, the total number of transactions handled by the system, and the total number of queries that the system can handle.

The projection results 136 from the projection framework 133 can be used to prepare a test configuration for a subsequent round of stress testing. The test build, including the docker file, can be sent to the projection framework 133. The projection framework 133 can be a machine learning model that is trained, or post trained, to suggest resource configuration(s) for a given test configuration and desired stress test performance. The results from the stress test(s) can be used to train the projection framework 133 to suggest resource configuration(s).

The suggested resource configurations can be selected from a pool of available resources specified in the test configuration. In some embodiments, the desired stress test performance can include a resources budget (e.g., $1200 a month) and the projection framework can select resource configurations based on the resource budget. The projection framework 133 may provide a list of resource configurations that are sufficient to satisfy the requirements specified in the test configuration. The resource configurations output by the projection framework 133 can be ranked by one or more criteria. For instance, the resource configurations can be ranked by performance (e.g., by latency), or cost of hosting the cloud service on the resource configurations.

Figure 2:
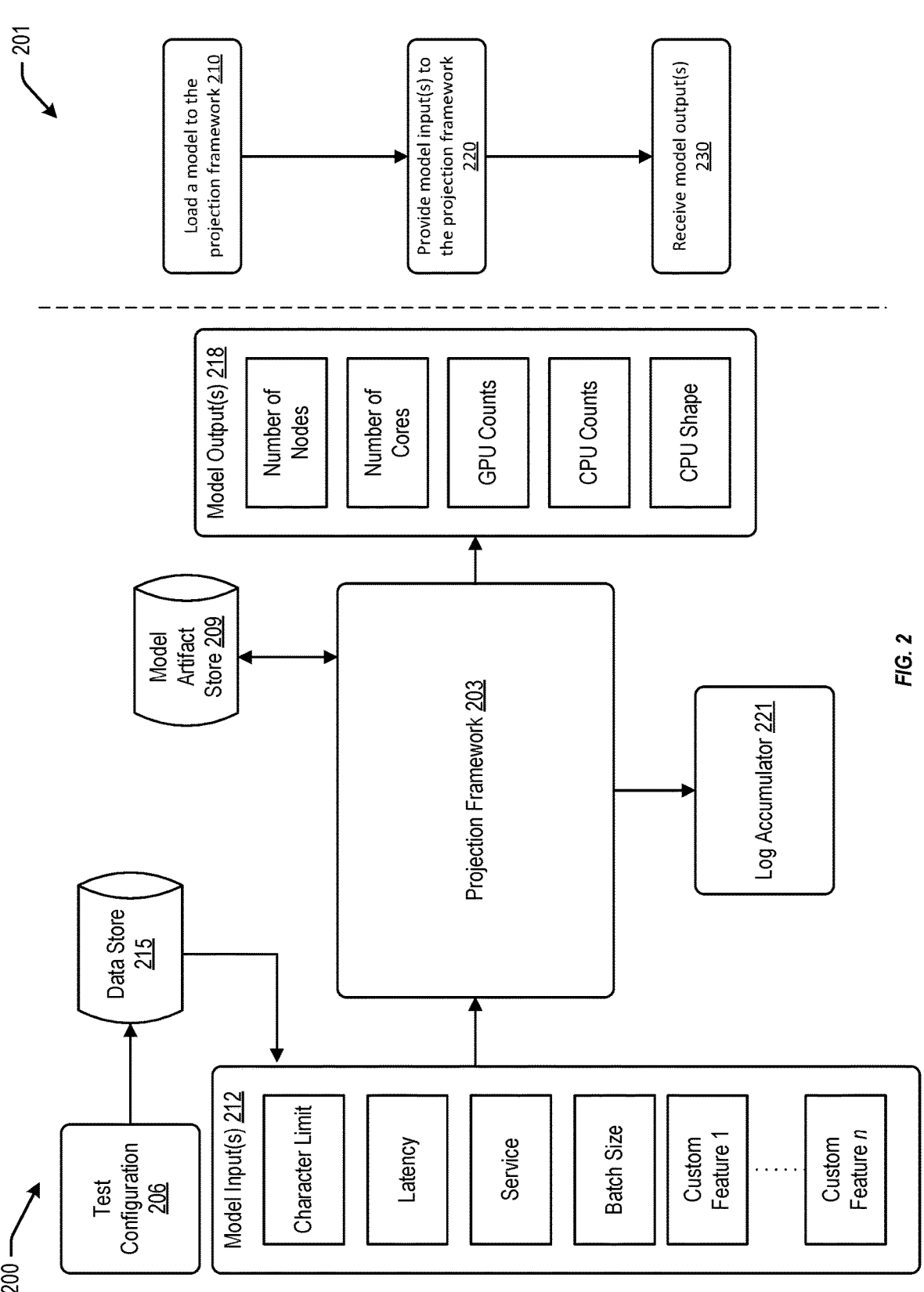
FIG. 2 shows a simplified diagram of a projection framework and a method of using the framework according to various embodiments.

FIG. 2 shows a simplified diagram 200 of a projection framework and a method 201 of using the framework according to various embodiments. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 201 in greater detail, at block 210 a model can be loaded into the projection framework. The projection framework 203 can be used to train a classification model (e.g., machine learning model) to project one or more resources configurations for a given test configuration. A model can be trained using feature vectors generated from a test configuration where the feature vectors have a known classification (e.g., resource configuration). The classification for the feature vectors can be the results (e.g., resource configurations) from the stress test from block 130. The machine learning model can be trained to project additional resource configurations for the test configuration 206.

A model can be loaded to the projection framework 203 from the model artifact store 209. The loaded models can be trained to output one or more resource configurations for a given cloud service test configuration 206. The machine learning models loaded from the model artifact store 209 can be models based on algorithms including linear regression algorithms, logistic regression algorithms, decision tree algorithms, support vector machine algorithms, naive bayes algorithms, k-nearest neighbor algorithms, k-means algorithms, random forest algorithms, dimensionality reduction algorithms, or gradient boosting algorithms. In some embodiments, an algorithm can be loaded from the model artifact store 209 in order to train a machine learning model from the algorithm. The machine learning models loaded from the model artifact store 209 can include neural networks such as convolutional neural networks. In some embodiments, multiple models can be loaded into the projection framework 203. The machine learning models, and the models' training, are discussed in greater detail below with reference to FIGS. 3 and 4.

At block 220, model input(s) can be provided to the projection framework. The model inputs 212 can include features generated for the test configuration 206 such as a character limit for the cloud service, languages supported by the cloud service, the expected latency for the service, the service type (e.g., vison service, language service, etc.), model type for any models in the cloud service, or the batch size for any models in the service. A feature can be an individual measurable property of the cloud service. The batch size for a machine learning model can be the number of samples that are processed before the model is updated. Other model inputs are contemplated, and the model inputs can include one or more custom inputs.

The model input(s) 212 can be generated from the test configuration 206 that can be stored in a data store 215. The model input(s) may include the output from the stress test from block 130. The data store 215 can be a repository for storing and managing data such as a file system or database. Features can be extracted from the test configuration 205 stored in data store 215 and the features can be used as model inputs 212. The data store 215 can be part of the stress test orchestrator and the features may be extracted by the orchestrator in some embodiments.

At block 230, the model outputs can be received. The model outputs 218 can be a suggested resource configuration that can be used to implement the test configuration corresponding to the model inputs 212. Events from the projection framework can be logged in the log accumulator 221 and the events can be used for error handling.

The projection framework can be trained to forecast an application's parameters using the results of previous stress tests. Feature vectors, vectors containing information about an entity, can be created for a cloud service that was previously tested. Feature vectors can contain an ordered list of properties for a service. For example, the features for a language service can include the test parameters such as the service type, the service level agreement (SLA) requirements, a character limit for the service (e.g., the character limits for a chatbot), the expected latency for the service, the maximum batch size, whether a graphics processing unit (GPU) is required, the node types, the model or framework type, and one or more custom features. The feature vectors can include the stress test results such as information about the transactions per second, queries per second, the number of failed transactions, the kilobits (KBs) per second that the test build can handle, the total number of transactions handled by the system, and the total number of queries that the system can handle.

Feature vectors from past stress tests can be training samples that are used to train the model. The feature vectors can have a known classification associated with the vector. For example, the known classification for a test build can be derived from the cloud computing resources allocated to the test build such as the number of nodes, the number of cores, the graphical processing unit (GPU) counts, the central processing unit (CPU) counts, and the CPU shape. The feature vectors may include the projection results for the cloud service. Accordingly, the feature vectors can be used in conjunction with machine learning techniques (e.g., random forests, support vector machine, artificial neural networks, etc) to optimize a cost/loss function, to get the parameters of the classification model. As part of the training, the classification model is tuned, by updating model variables, until the predictive model accurately categorizes the training set.

An entire set of training samples can be split into a training set and a test set. The test set is not used during the training and will be used later to evaluate if the model, developed only with the training set, makes accurate predictions. If the model accurately categorizes the evaluation set, the model can be extended to categorize new data sets. Once the model is trained, a new input vector (e.g., a new service) can be classified, (e.g., deployment characteristics can be suggested for the new service).

Figure 3:
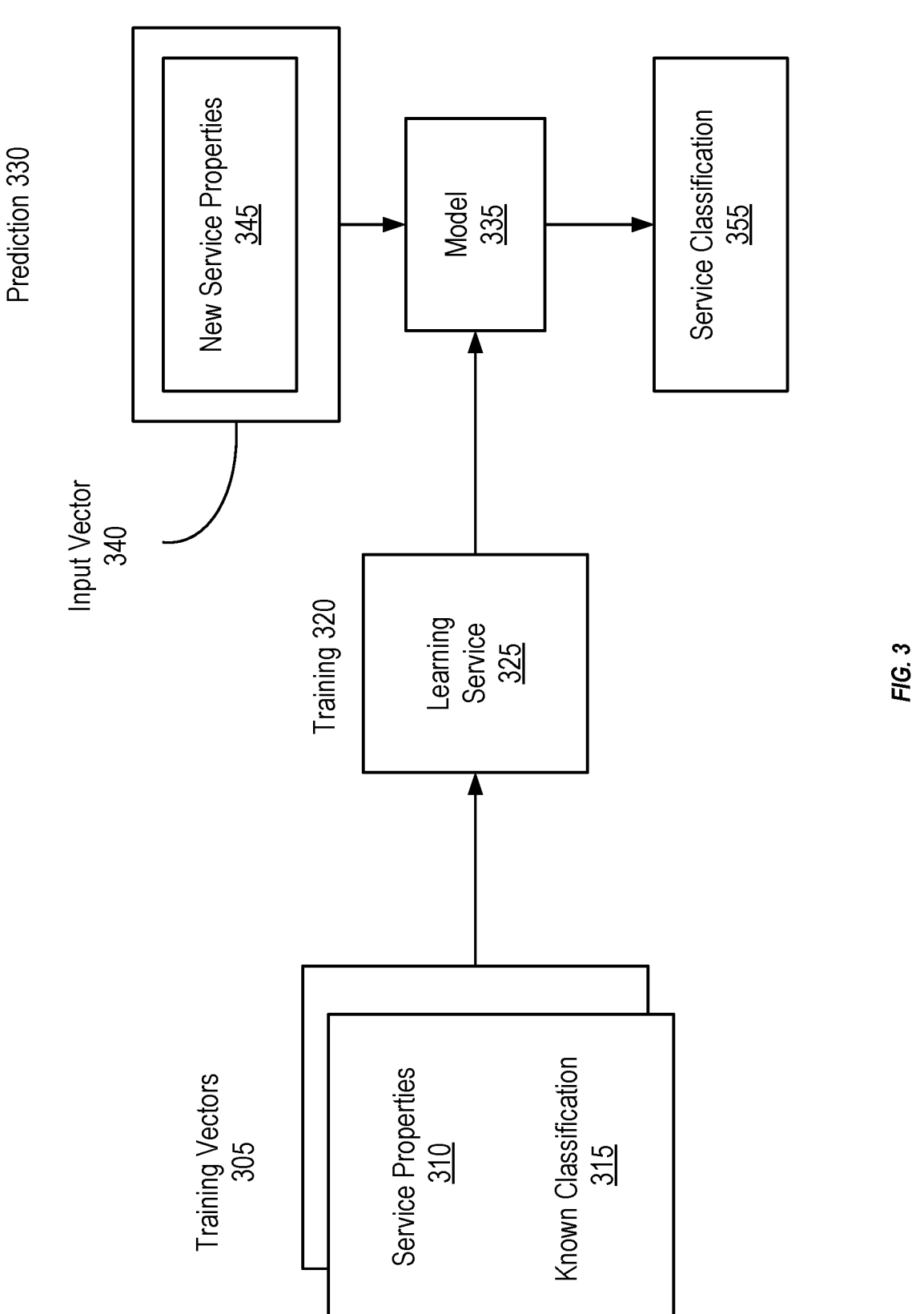
FIG. 3 depicts a machine learning model according to the embodiments of the present invention.

FIG. 3 depicts a machine learning model according to the embodiments of the present invention. Training vectors 305 are shown with service properties 310 and a known classification 1015. As examples, a service can be a machine learning model that can be deployed to a cloud network. Service properties 310 can include various fields. For ease of illustration, only two training vectors are shown, but the number of training vectors may be much larger, e.g., 10, 50, 100, 1,000, 10,000, 100,000, or more. Training vectors could be made for different services, the same service over different time periods.

Service properties 310 have property fields that can correspond to properties of a machine learning model or cloud service and the skilled person will appreciate the various ways that such services or models can be configured. Known classifications 315 include hardware or software characteristics such as the number of nodes, the number of central processing unit (CPU) cores, the number of graphical processing units (GPUs), the number of CPUs, the type of CPUs, the type of CPUs, the amount of memory, and the like. The classification can have arbitrary support (e.g., a real number) or be an element of a small finite set. The classification can be ordinal, and thus the support can be provided as an integer. Accordingly, a classification can be categorical, ordinal, or real, and can relate to a single measurement or multiple measurements and may be high dimensional.

Training vectors 305 can be used by a learning service 325 to perform training 320. Learning service 325 can optimize parameters of a model 335 such that a quality metric (e.g., accuracy of model 335) is achieved with one or more specified criteria. The accuracy may be measured by comparing known classifications 315 to predicted classifications. Parameters of model 335 can be iteratively varied to increase accuracy. Determining a quality metric can be implemented for any arbitrary function including the set of all risk, loss, utility, and decision functions.

In some embodiments of training, a gradient may be determined for how varying the parameters affects a cost function, which can provide a measure of how accurate the current state of the machine learning model is. The gradient can be used in conjunction with a learning step (e.g., a measure of how much the parameters of the model should be updated for a given time step of the optimization process). The parameters (which can include weights, matrix transformations, and probability distributions) can thus be optimized to provide an optimal value of the cost function, which can be measured as being above or below a threshold (i.e., exceeds a threshold) or that the cost function does not change significantly for several time steps, as examples. In other embodiments, training can be implemented with methods that do not require a hessian or gradient calculation, such as dynamic programming or evolutionary algorithms.

A prediction stage 330 can provide a predicted entity classification 355 for a new entity's entity signature vector (e.g., input vector 340) based on new service properties 345. The new service properties can be of a similar type as service properties 310. If new service properties are of a different type, a transformation can be performed on the data to obtain data in a similar format as service properties 310. Ideally, predicted service classification 1055 corresponds to the true service classification for input vector 340.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figure 4B:
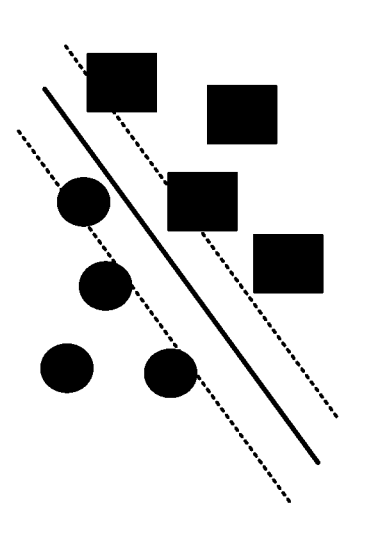
FIG. 4B shows an example machine learning model of a support vector machine (SVM).
Figure 4A:
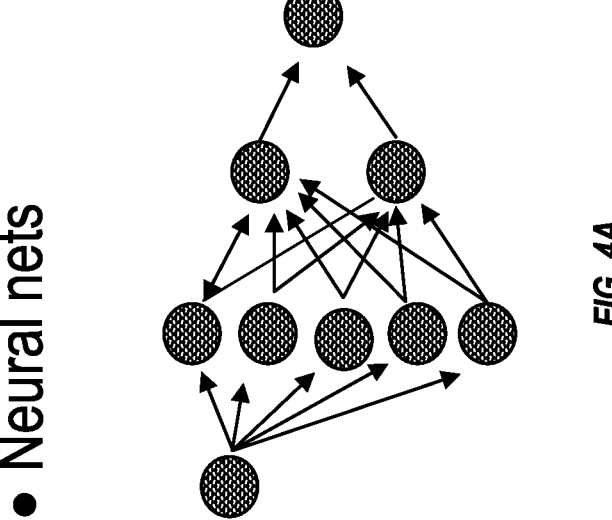
FIG. 4A shows an example machine learning model of a neural network.

FIG. 4A shows an example machine learning model of a neural network. As an example, model 435 can be a neural network that comprises a number of neurons (e.g., Adaptive basis functions) organized in layers. The training of the neural network can iteratively search for the best configuration of the parameter of the neural network for feature recognition and classification performance. Various numbers of layers and nodes may be used. A person with skills in the art can easily recognize variations in a neural network design and design of other machine learning models FIG. 4B shows an example machine learning model of a support vector machine (SVM). As another example, model 435 can be a support vector machine. Features can be treated as coordinates in a coordinate space. Samples of training data points (e.g., multidimensional data points composed of the measured data). The training data points are distributed in the space, and the support vector machine can identify boundaries between the classifications.

Figure 5:
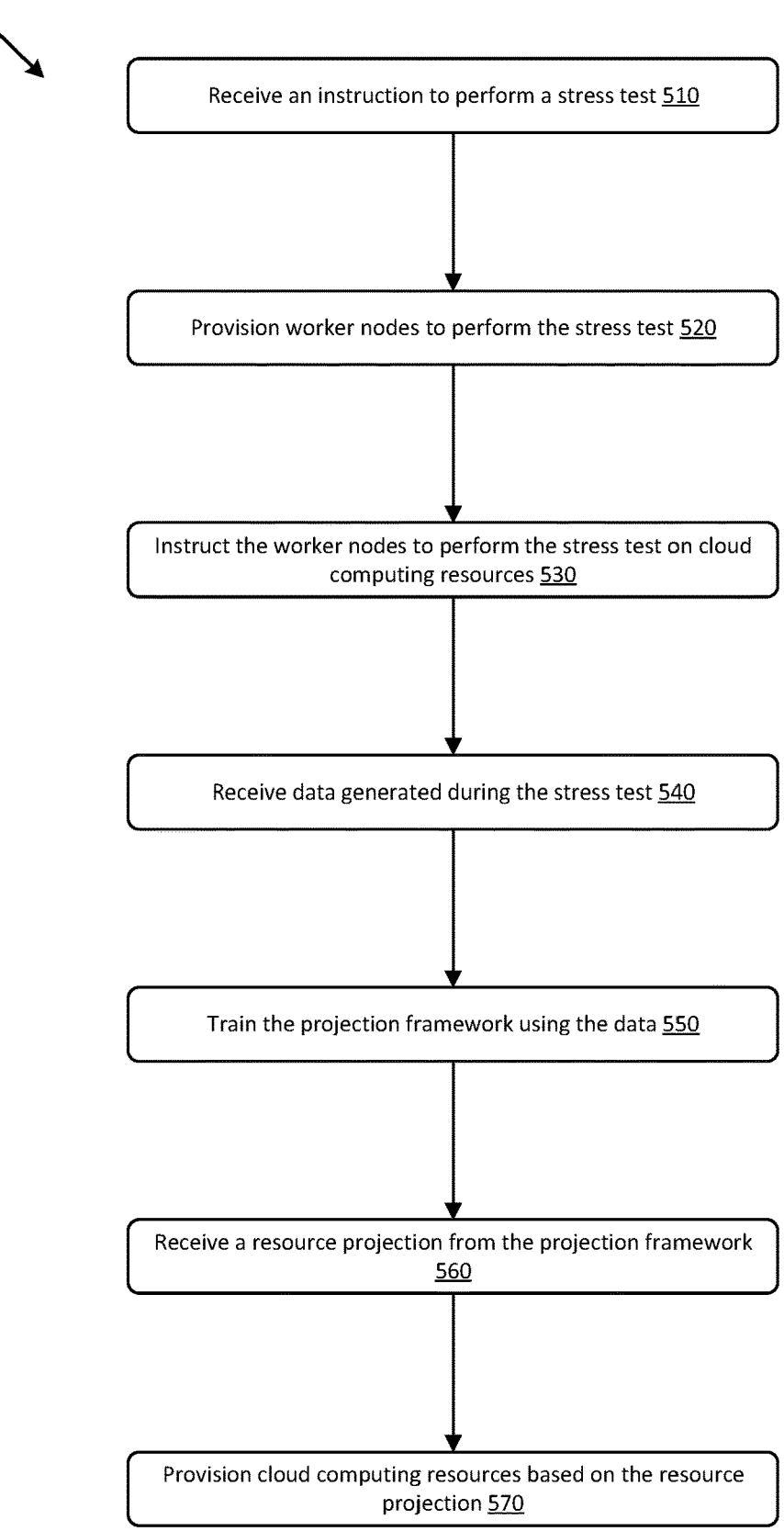
FIG. 5 is a diagram showing a method 500 for training a model to perform stress testing according to an embodiment.

FIG. 5 is a diagram showing a method 500 for training a model to perform stress testing according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 500 in greater detail, at block 510, an instruction to perform a stress test can be received. The instruction can be provided by a customer of a cloud service provider, or the instruction can be automatically generated at regular intervals (e.g., time based). For example, quarterly stress tests may be performed for cloud computing resources to ensure that the resources are performing adequately. The instruction can be automatically generated in response to an event (e.g., trigger based). For example, cloud computing resources may be tested if the resources' utilization drops below a threshold. The instruction to perform the stress test may include the results of a previous stress test. The instruction can be a test configuration 103, 206, and the instruction can be received at the stress test orchestrator 106.

At block 520, worker nodes can be provisioned to perform the stress test. The worker nodes can be provisioned by a resource manager 109 such as a Slurm Workload Manager. The resource manager 109 can distribute loads (e.g., test configurations) to the worker nodes 124 in a round robin fashion (e.g., round-robin scheduling).

At block 530, the worker nodes can be instructed to perform the stress test on cloud computing resources. The worker nodes may be assigned different cloud computing resource configurations and the nodes can perform stress tests on the different configurations simultaneously.

At block 540, data generated during the stress test performed at block 530 can be received. The data generated during the stress test (e.g., stress test performance) can include the latency for the test configuration, the queries per second (QPS), the transactions per second (TPS), the response delay, CPU utilization, memory utilization, and the like.

At block 550, a projection framework can be trained. The projection framework 133, 203 can comprise a machine learning model and the model can be trained using the test parameters and the data generated during the stress test from block 540. The data can be provided to the projection framework as feature vectors and the classification for the feature vectors can be the cloud computing resources allocated by the resource manager.

At block 560, a resource projection can be received from the projection framework. The resource configuration can be presented to a user via a display device. The resource configuration can be generated by the projection framework 133, 203 using the trained model and the desired stress test performance from the test configuration 103, 206 The trained model can be used to determine a cloud resource configuration that can provide a desired stress test performance for a cloud service. A user can specify test parameters, and a desired stress test performance, with the test configuration 103, 206. For example, the test parameters and desired stress test performance can be provided at block 110. The desired stress test performance can include a desired latency, queries per second (QPS), transactions per second (TPS), response delay, CPU utilization, memory utilization, etc. The resource configuration can be one or more resource configurations and the resource configurations can be ranked by one or more factors. The resource configuration can be the projection results 136 or the model output 218.

At block 570, cloud computing resources can be provisioned based on the resource projection. Provisioning the resources can mean increasing the region capacity of the cloud computing system by allocating resources to the region. In some embodiments, the cloud service can be deployed to the provisioned cloud computing resources. Provisioning the cloud computing resources can mean modifying the cloud computing resources for a cloud service that has been deployed. The resources can be provisioned by the resource manager 109.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
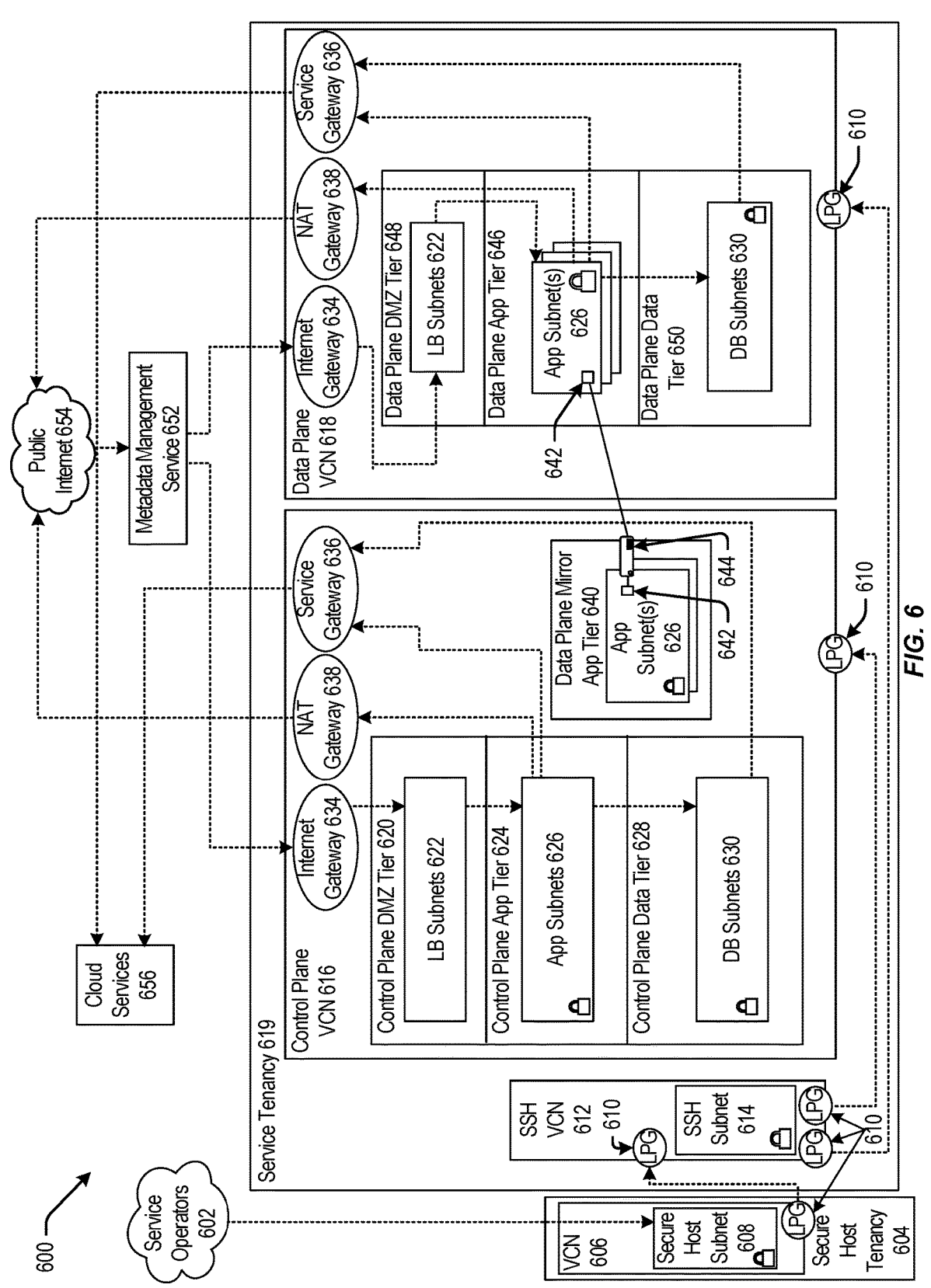
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
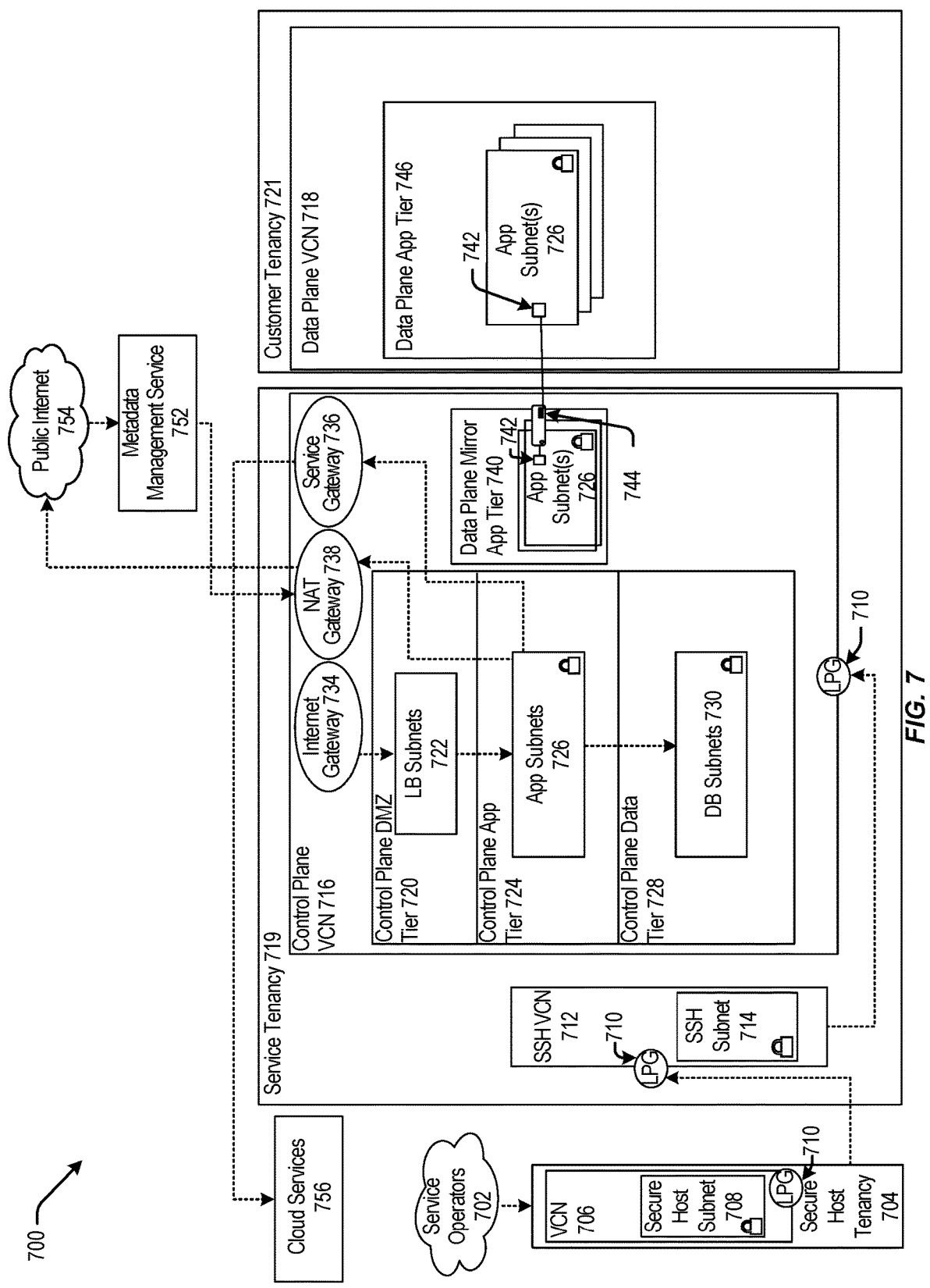
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
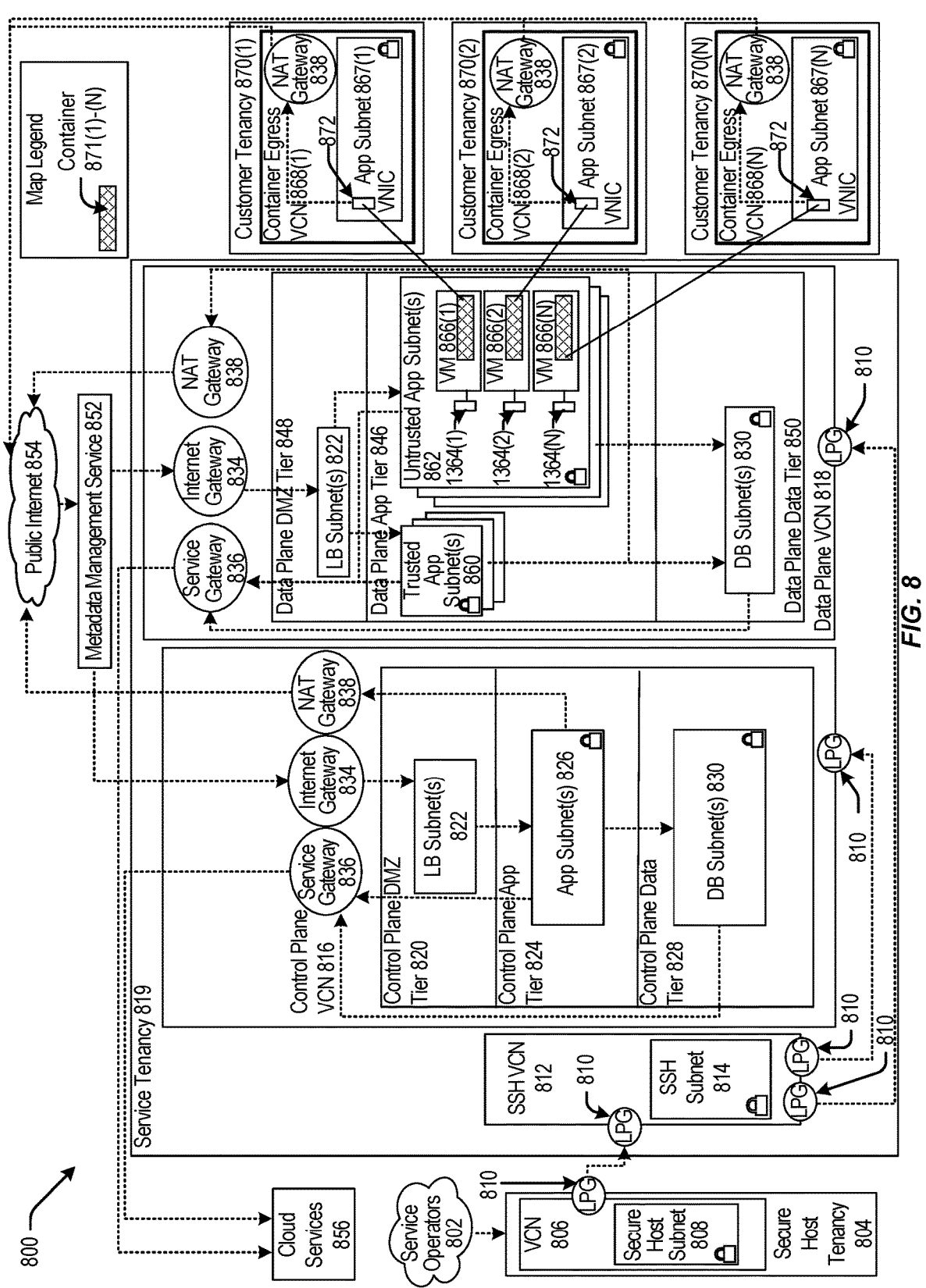
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane VCN 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s)

830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management service 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
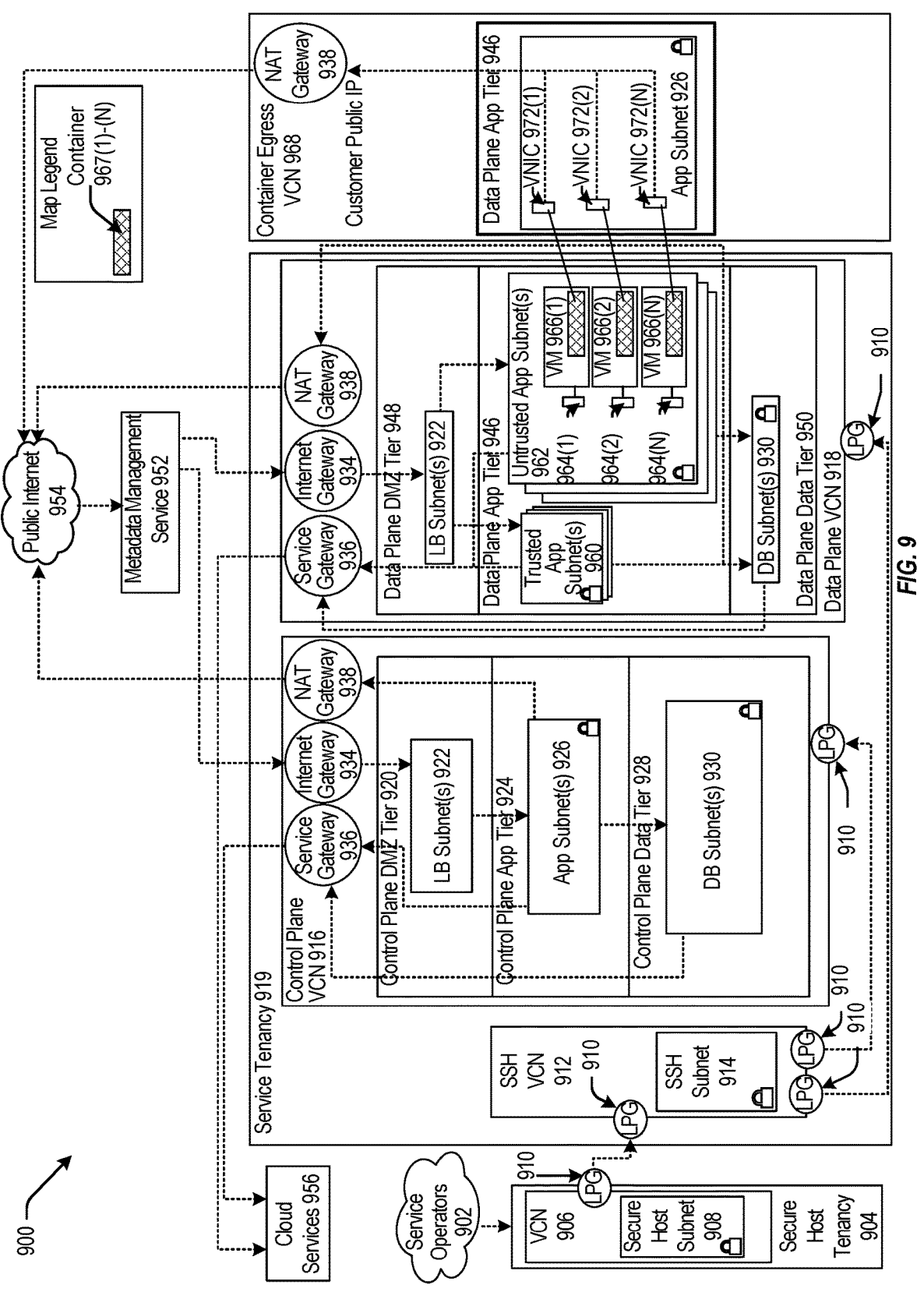
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane VCN 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management service 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967 (1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
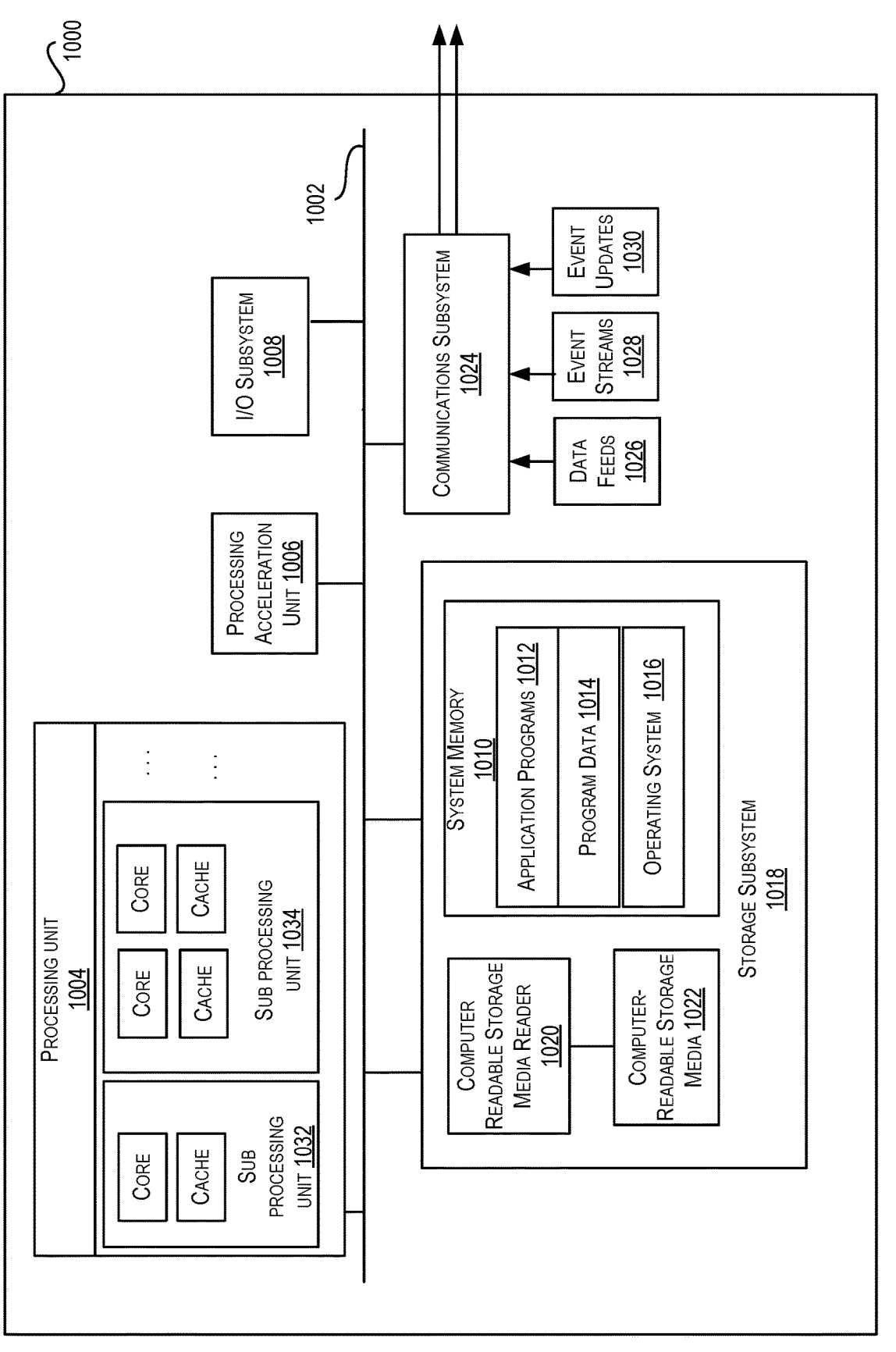
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/ Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, at a computing device, an instruction to perform a stress test on one or more test configurations for one or more cloud computing resources of a cloud computing system;
   provisioning, by a resource manager of the computing device, one or more worker nodes of a pool of worker nodes of the cloud computing system with the one or more test configurations to perform the stress test on the one or more test configurations for the one or more cloud computing resources;
   instructing, by the resource manager of the computing device, the one or more worker nodes of the cloud computing system to perform the stress test on the one or more test configurations for the one or more cloud computing resources;
   receiving, by the resource manager of the computing device, data generated by the one or more worker nodes during the stress test on the one or more test configurations;
   training, by the computing device, a projection framework comprising a trained machine learning model using the data generated by the one or more worker nodes during the stress test on the one or more test configurations for the one or more cloud computing resources;
   receiving, by the computing device, a resource configuration for the one or more cloud computing resources from the projection framework; and
   provisioning, by the computing device, the one or more cloud computing resources of the cloud computing system based on the resource configuration.

2. The method of claim 1, wherein the resource manager distributes loads to the one or more worker nodes in a round robin fashion.

3. The method of claim 1, wherein the instruction to perform the stress test is scheduled, time based, or trigger based.

4. The method of claim 1, wherein the instruction to perform the stress test comprises a past resource projection from a previous stress test.

5. The method of claim 1, wherein the resources manager is a slurm workload manager.

6. The method of claim 1, wherein the one or more worker nodes perform the stress test simultaneously.

7. The method of claim 1, wherein provisioning the one or more cloud computing resources based on the resource configuration comprises increasing a region capacity of the cloud computing system.

8. A system, comprising:

memory configured to store instructions; and one or more processors configured to execute the instructions to at least:

receive, at a computing device, an instruction to perform a stress test on one or more test configurations for one or more cloud computing resources of a cloud computing system;

provision, by a resource manager of the computing device, one or more worker nodes of a pool of worker nodes of the cloud computing system with the one or more test configurations to perform the stress test on the one or more test configurations for the one or more cloud computing resources;

instruct, by the resource manager of the computing device, the one or more worker nodes of the cloud computing system to perform the stress test on the one or more test configurations for the one or more cloud computing resources;

receive, by the resource manager of the computing device, data generated by the one or more worker nodes during the stress test on the one or more test configurations;

train, by the computing device, a projection framework comprising a trained machine learning model using the data generated by the one or more worker nodes during the stress test on the one or more test configurations for the one or more cloud computing resources;

receive, by the computing device, a resource configuration for the one or more cloud computing resources from the projection framework; and provision, by the computing device, the one or more cloud computing resources of the cloud computing system based on the resource configuration.

9. The system of claim 8, wherein the resource manager distributes loads to the one or more worker nodes in a round robin fashion.

10. The system of claim 8, wherein the instruction to perform the stress test is scheduled, time based, or trigger based.

11. The system of claim 8, wherein the instruction to perform the stress test comprises a past resource projection from a previous stress test.

12. The system of claim 8, wherein the resources manager is a slurm workload manager.

13. The system of claim 8, wherein the one or more worker nodes perform the stress test simultaneously.

14. The system of claim 8, wherein provisioning the one or more cloud computing resources based on the resource configuration comprises increasing a region capacity of the cloud computing system.

15. A non-transitory computer-readable medium storing a set of instructions, the set of instructions comprising one or more instructions that, when executed by one or more processors of a device, cause the device to:

receiving, at a computing device, an instruction to perform a stress test on one or more test configurations for one or more cloud computing resources of a cloud computing system;

provisioning, by a resource manager of the computing device, one or more worker nodes of a pool of worker nodes of the cloud computing system with the one or more test configurations to perform the stress test on the one or more test configurations for the one or more cloud computing resources;

instructing, by the resource manager of the computing device, the one or more worker nodes of the cloud computing system to perform the stress test on one or more test configurations for the one or more cloud computing resources;

receiving, by the resource manager of the computing device, data generated by the one or more worker nodes during the stress test on the one or more test configurations;

training, by the computing device, a projection framework comprising a trained machine learning model using the data generated by the one or more worker nodes during the stress test on the one or more test configurations for the one or more cloud computing resources;

receiving, by the computing device, a resource configuration for the one or more cloud computing resources from the projection framework; and provisioning, by the computing device, the one or more cloud computing resources of the cloud computing system based on the resource configuration.

16. The medium of claim 15, wherein the resource manager distributes loads to the one or more worker nodes in a round robin fashion.

17. The medium of claim 15, wherein the instruction to perform the stress test is scheduled, time based, or trigger based.

18. The medium of claim 15, wherein the instruction to perform the stress test comprises a past resource projection from a previous stress test.

19. The medium of claim 15, wherein the one or more worker nodes perform the stress test simultaneously.

20. The medium of claim 15, wherein provisioning the one or more cloud computing resources based on the resource configuration comprises increasing a region capacity of the cloud computing system.

* * * * *